Figure 1:
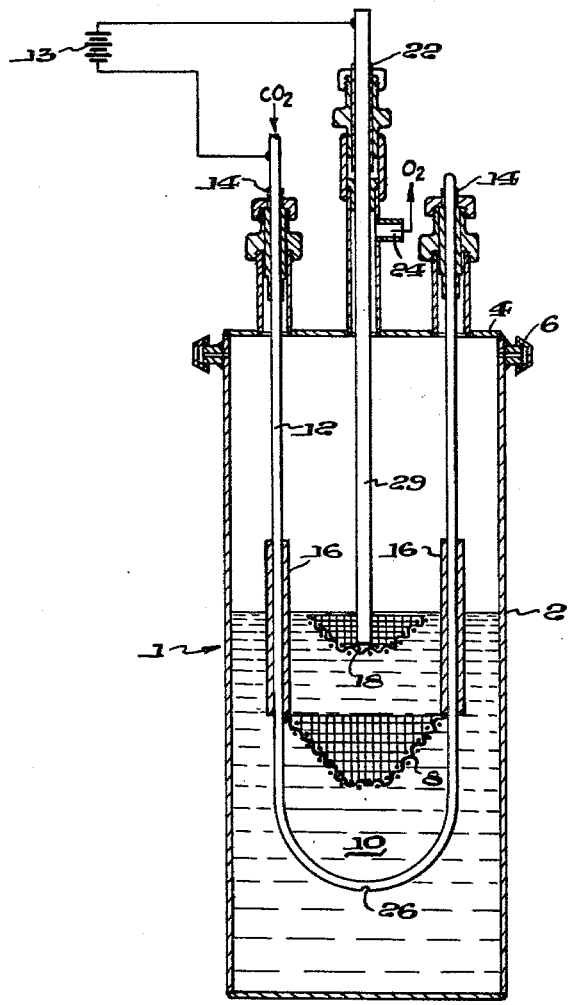

INVENTORS.
ROBERT E. SHEARER,
JOHN C. KING.
BY Ronald H. Shakely
their
AGENT

INVENTORS.
ROBERT E. SHEARER,
JOHN C. KING
BY Ronald H. Shakely
their AGENT

3,173,849
OXYGEN GENERATION

Robert E. Shearer, Edgewood, and John C. King, Mars, Pa., assignors to M.S.A. Research Corp., Pittsburgh, Pa., a corporation of Pennsylvania
Filed Jan. 30, 1961, Ser. No. 85,796
12 Claims. (Cl. 204—60)

This invention relates to the generation of oxygen and to the maintenance of respirable atmospheres by the conversion of expired carbon dioxide to oxygen.

In order to provide respiratory requirements to sealed chambers, as for example submarines and aircraft, it is necessary to supply oxygen and remove carbon dioxide. The various prior methods of supplying oxygen include providing a source of compressed or liquefied oxygen, chemically generating oxygen as from potassium superoxide or sodium chlorate-iron mixtures, or catalytically decomposing oxygen-rich compounds such as hydrogen peroxide. Carbon dioxide has been removed to maintain a tolerably low concentration by non-regenerative absorption, as with lithium hydroxide or potassium superoxide, or by absorption-desorption procedures using ethanolamines, carbonate solutions, or the like. The expired carbon dioxide has heretofore been considered merely a deleterious substance to be removed and discarded.

It is, therefore, an object of this invention to provide a method of converting carbon dioxide to oxygen suitable for breathing. Another object is to provide a method of maintaining a respirable atmosphere by removing expired carbon dioxide from the atmosphere and generating oxygen from the carbon dioxide.

A still further object is to provide a method of producing oxygen by electrolysis of alkali metal or alkaline earth metal carbonates. Other objects will become apparent from the following descriptions and claims.

This invention is based on our discovery that oxygen is produced by the electrolysis of certain alkali metal or alkaline earth metal carbonates, either fused or dissolved in inert fused salt solvents, when the anode gases are contacted with the catholyte, and that carbon dioxide reacts with the alkali metal or alkaline earth metal oxides produced by the electrolysis to regenerate carbonates, thereby providing a closed reaction cycle for recovering oxygen from carbon dioxide according to:

$$M_{3-n}CO_3 \rightarrow M_{3-n}O + O_2 + C \text{ (electrolysis)}$$
$$M_{3-n}O + CO_2 \rightarrow M_{3-n}CO_3 \text{ (regeneration)}$$
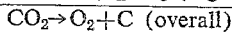
$$CO_2 \rightarrow O_2 + C \text{ (overall)}$$

where M is an alkali metal or alkaline earth metal and $n$ is the valence of the metal. The electrolysis and regeneration reactions may be carried out sequentially or simultaneously as is hereinafter described in detail.

Suitable for use in this invention are the carbonates and oxides of those alkali or alkaline earth metals the free energy of formation of whose oxide is greater than —125 kcal. at 300° K., namely, the carbonates and oxides of lithium, calcium, magnesium, barium, and strontium. Salts of these metals will hereinafter be referred to metal salts, e.g. metal carbonates or metal oxides.

Figure 2:
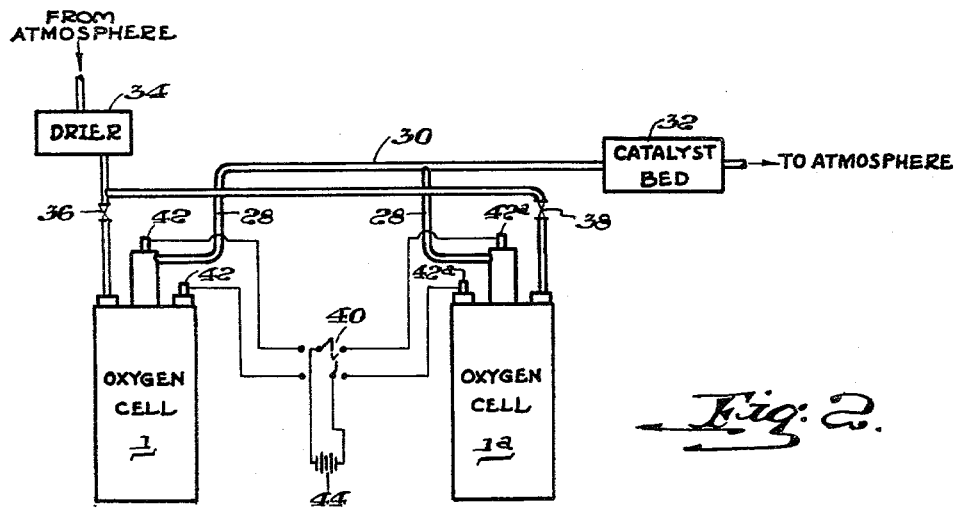
Figure 3:
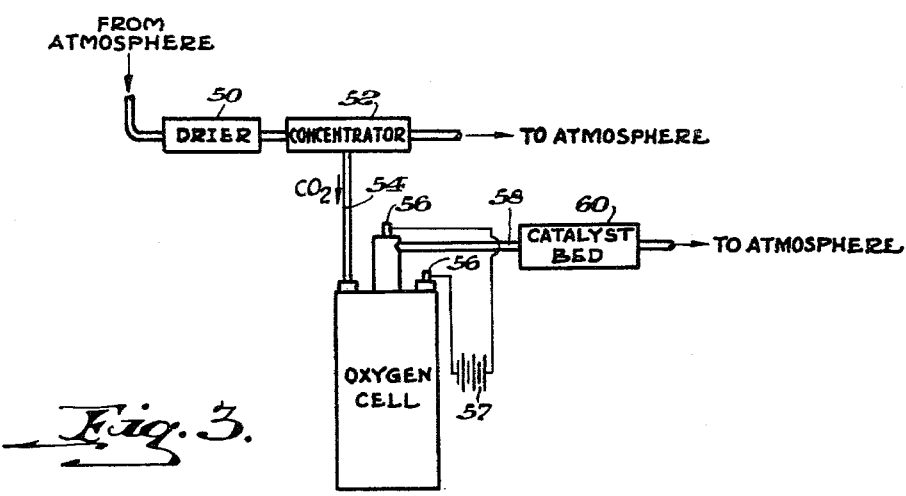

FIG. 1 is sectional view of an electrolytic cell for the production of oxygen;

FIG. 2 diagrammatically illustrates an air purification system utilizing the cell of FIG. 1; and FIG. 3 diagrammatically illustrates another air purification system utilizing the cell of FIG. 1.

The electrolysis

Oxygen is produced by the electrolysis of fused carbonates of lithium, calcium, magnesium, barium, and/or strontium. The fused electrolyte may consist of one or more of the carbonates alone, or one or more of the carbonates may be fused along with other inert salts to provide increased conductivity or lower melting mixtures. Suitable inert salts must have a lithium, calcium, magnesium, barium or strontium cation and an anion which is discharged at a higher potential than the carbonate ion, such as for example halides and borates.

The anode reaction produces only gaseous products according to the equation $$CO_3 \rightarrow CO_2 + \tfrac{1}{2} O_2 + 2e$$

which gases are contacted with catholyte. Catholyte as used herein refers to the electrolyte in the vicinity of the cathode, and is not limited to a barrier separated electrolyte in a cathode compartment. The cathode reaction involves both a primary electrode reaction and secondary chemical reactions in the electrolyte. The primary reaction is the discharge of the alkali or alkaline earth metal, as for example $2Li^+ + 2e \rightarrow 2Li$. The secondary reactions are not completely understood, but the ultimate reaction products are oxygen, metal oxide, and carbon. The oxygen is evolved as a gas, the metal oxides are dissolved in the melts, and the carbon both builds up on the cathode and settles as a precipitate on the cell bottom.

It is essential to produce oxygen of high purity with a high efficiency that the anode gases be contacted with the catholyte, that is, the electrolyte in the vicinity of the cathode. To illustrate the importance of this, the electrolysis of lithium carbonate using horizontally spaced electrodes having separate gas collection hoods produces typically anode gases containing from about 50–70% oxygen, 25–50% carbon dioxide, and up to about 0.2% carbon monoxide; and cathode gases containing about 20–50% oxygen, 40–80% carbon dioxide, and in excess of 0.2% carbon monoxide. In contrast, when anode gases are contacted with the catholyte, the electrolysis of lithium carbonate yields 98–99+% oxygen containing two percent or less carbon dioxide and only a few hundredths percent carbon monoxide.

The mixing of anode gases with catholyte can be accomplished in a number of ways and in a variety of cell configurations. For example, lithium carbonate was melted in a stainless steel cylindrical cell body 1 inch in diameter and 12 inches long, having a top closure with suitable openings for gas discharge and insertion of a ⅛-inch rod cathode on the axis of the cell body; the cell body was used as the anode and the cathode rod was inserted to a depth of ⅜ inch into the melt. The melt was dried by inert gas flushing and electrolyzed at 750° C. using 3.8 volts potential giving a current flow of 31 amps, or an anode current density of 0.37 amps/cm.$^2$ and a cathode current density of 33 amps/cm.$^2$. The gases discharged from the cell had the composition 98% oxygen, approximately 2% carbon dioxide, and 0.04% carbon monoxide. In cells of this type mixing of anode gases with catholyte occurs because of the close proximity of anode and cathode. Generally, however, cells having closely spaced electrodes require frequent changing of cathodes; carbon deposits build up on the cathode and bridge the space to the anode causing short circuiting. For example, cells 1 inch in diameter having a ¼″ diameter cathode may require cathode cleaning or replacement every 6–8 hours.

In another electrolysis using the same type cell but reversing the anode and cathode, a molten electrolyte of 28% $Li_2CO_3$—58.5% $LiCl$—13.5% $LiF$, was electrolyzed at 5.4 volts giving an anode current density of less than 7.0 amps/cm.$^2$ and a very low cathode current density. The oxygen produced was substantially pure, containing only a trace of carbon dioxide and 0.14% carbon monoxide.

Another suitable method of mixing anode gases and catholyte is to use the cell body as an anode, and to use a disc or screen cathode of slightly smaller diameter than the cell body only slightly immersed in the electrolyte. Thus, for example, a molten electrolyte of 55% $Li_2CO_3$ and 45% LiCl was contained in a 3-inch diameter stainless steel pot used as an anode; a 2-inch diameter ¼-inch-mesh stainless-steel screen cathode was just submerged in the melt. Electrolysis at 2.4 volts and 65 amps produced substantially pure oxygen containing no measurable carbon dioxide and only 0.04% carbon monoxide.

FIG. 1 illustrates a preferred cell for the production of oxygen according to this invention. The cell 1 comprises a cell body 2 of any material suitable to contain the molten electrolyte such as carbon steel, alkaline refractories, ceramic lined metals or preferably stainless steels, such as, for example, ferritic stainless steels. A cover plate 4, having suitable openings for electrode and gas fittings is removably secured to the cell body, as by Marman flange 6. A screen anode 8, immersed in electrolyte 10, is conveniently supported by conduit 12 which serves both as an electrical conductor from a D.C. source 13 and a gas introduction conduit. Conduit 12 is electrically insulated from the cell body by insulators 14, and from the electrolyte above the anode by ceramic insulating sleeves 16. The screen cathode 18 is immersed near the surface of the electrolyte above the anode, and is supported by rod 29 which is connected to the D.C. source and insulated from the cell body by insulator 22. The cathode is preferably shaped as an inverted cone sloping toward the surface of the melt to facilitate gas disengagement and prevent gas polarization of the electrode; the anode is also conical to maintain equal spacing between the electrode surfaces. Oxygen generated by the cell is discharged through conduit 24.

The electrolysis reaction to produce $CO_2$ consumes metal carbonate, and we have found the carbonate can be regenerated simultaneously with electrolysis by introducing carbon dioxide to the electrolyte preferably at a location substantially below the cathode. In the cell of FIG. 1, carbon dioxide is introduced to the electrolyte through conduit 12 and opening 26 in the conduit.

Any substantially inert electrodes are suitable for use, such as for example carbon steels and stainless steels, preferably ferritic stainless steels. It is understood that inert is used herein as opposed to consumable electrodes and includes electrodes that may suffer corrosion or erosion by the electrolyte. Carbon may be used as a cathode, but is not suitable for an anode since it is reactive with nascent gases produced at the anode. The electrodes may be of any form, such as rods or discs, but it is preferred to obtain highest capacity and efficiency to use high surface area electrodes, such as screens or perforated metals.

The following example is illustrative of the reaction of the cell shown in FIG. 1, using a cell body 4 inches in diameter and an 8-inch depth of electrolyte, a 60 sq. cm. stainless-steel ¼-inch-mesh screen cathode, and an 80 sq. cm. stainless-steel ¼-inch-mesh screen anode situated one inch below the cathode. The molten electrolyte of 45% $Li_2CO_3$—55% LiCl was dried as herebefore described, and maintained at a temperature of 590° C. The melt was electrolyzed at 3.2 volts giving a current of 22 amps for about 8 hours, and carbon dioxide was continuously introduced to the melt at a rate of 1 liter per hour throughout the electrolysis. Over 19 liters (STP) of oxygen was generated at a rate of about 2.6 liters per hour; the oxygen was 98% pure, containing about 2% carbon dioxide and 0.01% carbon monoxide. One pound of oxygen was produced for each 8.8 kw.h. of electricity used.

Only carbonates of alkali or alkaline earth metals the free energy of formation of whose oxide is greater than 125 kcal. per gram atom at 300° K. are suitable for use in this invention. The deleterious effect of other alkali metal or alkaline earth metal ions is demonstrated by the electrolysis of an electrolyte containing 27% $Li_2CO_3$, 45% $K_2CO_3$, and 38% $Na_2CO_3$; the free energy of formation of both sodium oxide and potassium oxide is less than −125 kcal. at 300° K. The melt was maintained at 470° in a 1 inch diameter cell used as an anode having a ¼ inch diameter cathode as previously described, and electrolyzed at 8.5 volts giving a current of 8 amps. The gases produced had the composition of approximately 25% oxygen, 75% carbon dioxide, and 0.16% carbon monoxide. The electrode deposits indicated the formation of free metal and metal carbides.

The cell is operable at any temperature at which the electrolyte is molten, but it is preferred to use temperature below about 800° C. to prevent any substantial production of carbon dioxide by thermal decomposition of the electrolyte. It is generally preferred to use a temperature between about 550 and 650° C., which provides a low viscosity melt with substantially no thermal decomposition.

The desired electrode reactions occur at any current density and with any voltage high enough to discharge the carbonate ion. The necessary minimum voltage varies with electrolyte composition, but is generally about 2.4 volts. Maximum practical voltages depend on cell and electrode configuration, and are preferably below that which produces a high enough current density to cause gas polarization of the electrodes.

Maintenance of respirable atmospheres

It is necessary to supply oxygen for respiration and to remove expired carbon dioxide to maintain an atmosphere that will support animal life. According to this invention oxygen is provided by the electrolysis of metal carbonates as heretofore described. Carbon dioxide is removed by absorbing it in the electrolyte, thereby regenerating carbonate for further electrolysis.

The electrolytically-produced oxygen may contain a very small amount of carbon monoxide, which must be removed to prevent dangerous accumulations in isolated atmospheres. It can be removed by conventional methods such as absorption, or most conveniently by catalytic combustion to carbon dioxide using conventional combustion catalysts.

The electrolysis cells are operable to produce oxygen if water vapor is introduced with the gas stream containing expired carbon dioxide, but this decreases the efficiency of the oxygen-producing electrolysis. It is therefore preferred to dry the carbon dioxide containing atmosphere before it is introduced to the cell. It is generally preferred to concentrate the carbon dioxide in the atmosphere, e.g. at least about 80% carbon dioxide, to avoid the unnecessary heating of inert gases in the atmosphere. This is especially desirable in cells where oxygen generation and carbon dioxide absorption are performed simultaneously, since the passage of substantial amounts of inert gases through the cell during electrolysis slightly increases the amount of carbon dioxide and carbon monoxide in the produced oxygen. The concentration of carbon dioxide can be accomplished by conventional methods, such as sorption-desorption concentration.

Referring to FIG. 2, there is schematically illustrated a system in which the gas conduits to and from multiple cells are parallel connected so that each of two cells, or banks of cells, can be alternately used for oxygen generation or carbon dioxide removal. The oxygen outlets 28 of two cells as heretofore described, 1 and 1a, open to the atmosphere through manifold 30 and catalyst bed 32, which catalytically oxidizes carbon monoxide to carbon dioxide. Any conventional catalyst such as noble metal catalysts or metal oxide catalysts may be used; the use of well-known mixed metal oxide oxidation catalysts which are effective at ambient or moderately elevated temperatures are especially convenient. The atmosphere containing expired $CO_2$ is forced, as by a blower, not shown, through a drier 34, and may be directed through either of the two cells by valves 36 and 38. A plurality of regenerative drying beds, such as silica gel beds, can be used in a conventional manner to provide for alternating drying and drier regeneration operation. Double pole double throw switch 40 is closed to connect the electrodes, 42 and 42a, of either cell to D.C. source 44.

The operation of this system is described when cell 1 is used to generate oxygen and cell 1a is used to remove $CO_2$. Cell 1 contains a metal carbonate electrolyte and cell 1a contains an exhausted or partially exhausted electrolyte; i.e. an electrolyte containing metal oxide. This may be provided either by the electrolytic generation of oxygen from the cell or by adding metal oxide to a carbonate electrolyte. Valve 36 is closed and valve 38 is opened directing the dried atmosphere from drier 34 to cell 1a where it is contacted with the molten electrolyte containing metal oxide, whereby carbon dioxide is absorbed and metal carbonate is generated. The substantially carbon dioxide-free atmosphere discharges from cell 1a through conduit 28a. Switch 44 is closed to connect electrodes 42 in cell 1 to the D.C. source, and oxygen is electrolytically generated, and discharged through conduit 28. The effluent gases from both cells are combined in manifold 30 and discharged through catalyst bed 32 to the atmosphere. When cell 1 has become completely or partially exhausted the operation of the two cells is reversed, thereby providing a continuous supply of oxygen and continuous removal of carbon dioxide.

FIG. 3 schematically illustrates a system in which carbon dioxide is absorbed simultaneously with the generation of oxygen is one cell, or one bank of cells. The atmosphere is dried in drier 50 in the same manner as in the FIG. 2 system. Carbon dioxide of at least about 80% purity is separated from the dried atmosphere by concentrator 52, which may be a conventional absorption-desorption concentrator. The concentration may be conveniently accomplished with molecular sieve beds. The atmosphere is forced through a molecular sieve bed which retains $CO_2$ and passes other atmosphere gases which are returned to the atmosphere, the bed is heated to cause the release of substantially pure carbon dioxide, and finally the bed is cooled to prepare it for repeating the cycle. Three beds are parallel connected so that one bed is always in the absorption cycle, one bed is in the desorption cycle, and one bed is in the cooling cycle. The dried carbon dioxide passes through conduit 54 into the electrolyte contained in cell 1 where it is removed by reaction with metal oxide in the electrolyte. Electrodes 56 are connected to a D.C. source 57, and oxygen is generated as heretofore described. The effluent cell gases are discharged and returned to the atmosphere through conduit 58, and catalyst bed 60, as in the FIG. 2 system. In the operation of this system the electrolysis of the molten carbonate electrolyte is started, and the atmosphere is forced through the system, whereby dry carbon dioxide is separated and removed by the electrolyte simultaneously with the electrolytic generation of oxygen.

According to the provisions of the patent statutes, we have explained the principle of our invention and have illustrated and described what we now believe to represent its best embodiments. However, we desire to have it understood that within the scope of the appended claims the invention may be practiced otherwise than as specifically illustrated and described.

We claim:

1. A method of preparing oxygen which comprises electrolyzing between inert electrodes a fused electrolyte consisting essentially of at least one carbonate selected from the group consisting of lithium carbonate, calcium carbonate, magnesium carbonate, strontium carbonate and barium carbonate, contacting the anode gases produced thereby with catholyte, and recovering the oxygen produced.

2. A method according to claim 1 in which the electrolyte contains at least one inert salt consisting of an anion having a higher discharge potential than carbonate ion and a cation selected from the group consisting of lithium, calcium, magnesium, strontium and barium.

3. A method according to claim 2 in which the electrolyte is a mixture of lithium carbonate and a lithium halide.

4. A method according to claim 1 in which the temperature is below about 800° C.

5. A method according to claim 1 in which the electrolyte is lithium carbonate.

6. A method according to claim 2 in which the lithium halide is lithium chloride.

7. A method of preparing oxygen from carbon dioxide which comprises the steps of electrolyzing between inert electrodes a fused electrolyte consisting essentially of at least one carbonate selected from the group consisting of lithium carbonate, calcium carbonate, magnesium carbonate, strontium carbonate and barium carbonate, contacting the anode gases with the catholyte, recovering the oxygen produced and contacting carbon dioxide with said electrolyte thereby regenerating carbonate ion.

8. A method according to claim 7 in which the electrolyte contains at least one inert salt consisting of an anion having a higher discharge potential than carbonate ion and a cation selected from the group consisting of lithium, calcium, magnesium, strontium and barium.

9. A method according to claim 7 in which the electrolysis is performed simultaneously with the carbonate regeneration.

10. A method of preparing oxygen from carbon dioxide which comprises the steps of electrolyzing fused lithium carbonate between inert electrodes, contacting the anode gases produced thereby with the catholyte, and contacting carbon dioxide with said electrolyte to regenerate lithium carbonate.

11. A method of preparing oxygen from carbon dioxide which comprises the steps of electrolyzing fused mixture of lithium carbonate and lithium chloride between inert electrodes, contacting the anode gases produced thereby with the catholyte, and contacting carbon dioxide with said electrolyte to regenerate lithium carbonate.

12. A method of removing carbon dioxide from and replenishing oxygen to an atmosphere containing carbon dioxide which comprises the steps of removing water vapor from said atmosphere, contacting said atmosphere with a fused electrolyte consisting essentially of (1) oxide anion and at least one anion selected from the group consisting of carbonate ion and inert anions having a discharge potential higher than carbonate ion, and (2) at least one cation selected from the group consisting of lithium, calcium, magnesium, strontium, and barium, to form carbonate ion; electrolyzing the resulting electrolyte between inert electrodes, contacting the resulting anode gases with the catholyte, and returning the oxygen formed to said atmosphere.

References Cited by the Examiner

UNITED STATES PATENTS

| 1,334,179 | 3/20 | Smith et al. | 204—68 |
| 2,870,071 | 1/59 | Juda et al. | 204—247 |
| 2,975,111 | 3/61 | Reimert et al. | 204—246 |

FOREIGN PATENTS

| 582,642 | 9/59 | Canada. |
| 25,957 | 11/13 | Great Britain. |

JOHN H. MACK, *Primary Examiner.*

JOHN R. SPECK, *Examiner.*